UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION OF GERMANY.

ANTHRACENE DYE AND PROCESS OF MAKING SAME.

No. 929,442.     Specification of Letters Patent.     Patented July 27, 1909.

Application filed March 25, 1909. Serial No. 485,672.

*To all whom it may concern:*

Be it known that I, MAX HENRY ISLER, chemist, citizen of the Swiss Republic, residing at Mannheim, Germany, have invented new and useful Improvements in Anthracene Dyes and Processes of Making the Same, of which the following is a specification.

In the specification of Letters Patent No. 856,811 is described the production of coloring matter of the anthracene series by heating 2.2'-dimethyl-1.1'-dianthraquinonyl, or a homologue, or derivative, thereof, either alone, or in the presence of a dehydrating agent, and with, or without, subsequent treatment with an oxidizing agent. The coloring matters therein described dye cotton, from the vat orange shades of excellent fastness. As an instance of the derivatives employed 4.4'-dichlor-2.2'-dimethyl-1.1'-dianthraquinonyl is mentioned, but in this case, and also in other cases where alpha-halogen derivatives are employed, it appears that the halogen atom is at any rate to some extent removed from the molecule during the reaction.

I have discovered that beta-halogenated 2.2'-dimethyl-1.1'-dianthraquinonyl bodies in which the halogen is not contained in the same ring as the methyl group can be treated in the manner described in the aforesaid specification, and that the specific coloring matters obtained possess properties which render them much more valuable than the coloring matters obtainable from the alpha-halogen-2.2'-dimethyl-1.1'-dianthraquinonyl bodies. The halogen atom remains intact in the molecule and the coloring matters dye cotton, particularly reddish shades of yellow and possess, moreover, an exceptional fastness against the action of chlorin. As compounds which can be thus used I mention 6.6'-dichlor-2.2'-dimethyl-1.1'-dianthraquinonyl and 7.7'-dichlor-2.2'-dimethyl-1.1'-dianthraquinonyl, either of which can be obtained by condensing together beta-chlorphthalic anhydrid and toluene by means of the Friedel-Crafts reaction and then subjecting the chlor-methyl-anthraquinone so obtained to nitration, reduction, diazotization, and treatment of the diazo compound with copper powder, as described in the aforesaid specification. Since the coloring matters obtainable from the aforementioned isomeric dichlor-dimethyl-dianthraquinonyl bodies differ very little from one another in their coloring properties, it is not necessary to separate the two compounds before converting them into coloring matter, which conversion into coloring matter can be done in a manner similar to that described in the aforesaid specification No. 856,811.

The coloring matters obtainable according to this invention possess the same generic properties as do the coloring matters obtainable by heating a 2.2'-dimethyl-1.1'-dianthraquinonyl body and treating the resulting compound with a halogenizing agent as described in the specification of Letters Patent No. 876,810, but some of them differ from the said described coloring matters in possessing a different spectrum.

Now what I claim is:

1. The process of producing anthraquinone coloring matter by heating a beta-halogenated 2.2'-dimethyl-1.1'-dianthraquinonyl body containing the halogen in the opposite ring to that containing the methyl group.

2. The process of producing anthraquinone coloring matter by heating a beta-halogenated 2.2'-dimethyl-1.1'-dianthraquinonyl body containing the halogen in the opposite ring to that containing the methyl group with a condensing agent.

3. The process of producing anthraquinone coloring matter by heating a beta-halogenated 2.2'-dimethyl-1.1'-dianthraquinonyl body containing the halogen in the opposite ring to that containing the methyl group with alcoholic potash.

4. The process of producing anthraquinone coloring matter by heating 6.6'-dichlor-2.2'-dimethyl-1.1'-dianthraquinonyl with alcoholic potash.

5. As new articles of manufacture the anthracene coloring matters which can be obtained from a beta-halogenated 2.2'-dimethyl-1.1'-dianthraquinonyl body, which new coloring matter consist of from yellow to brown powders which are insoluble in water and in dilute acids and in dilute alkalies and are soluble in concentrated sulfuric acid and in hot nitrobenzene and in hot anilin and which are also soluble in alkaline hydrosulfite yielding cherry red vats which produce on cotton blue-red shades which shades on washing are converted into bright orange-red, and which coloring matters possess a spectrum different from that of the coloring matters claimed in Letters Patent No. 876,810.

In testimony whereof I have hereunto set my hand in the presence of two subscribing witnesses.

MAX HENRY ISLER.

Witnesses:
J. ALEC. LLOYD,
JOS. H. LEUTE.